United States Patent
Verbrugge et al.

(10) Patent No.: US 7,600,381 B2
(45) Date of Patent: Oct. 13, 2009

(54) ELECTRIC HYBRID POWERTRAIN SYSTEM HAVING A MAGNETORHEOLOGICAL FLUID CLUTCH

(75) Inventors: Mark W. Verbrugge, Troy, MI (US); Patrick B. Usoro, Troy, MI (US); Anthony L. Smith, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 908 days.

(21) Appl. No.: 11/059,878

(22) Filed: Feb. 17, 2005

(65) Prior Publication Data

US 2006/0179844 A1    Aug. 17, 2006

(51) Int. Cl.
*F01B 21/04*    (2006.01)
(52) U.S. Cl. .......................................... 60/716; 60/718
(58) Field of Classification Search .................. 60/698, 60/716, 718
See application file for complete search history.

(56) References Cited

U.S. PATENT DOCUMENTS

| | | | |
|---|---|---|---|
| 5,558,595 A | 9/1996 | Schmidt et al. | 477/3 |
| 5,779,013 A * | 7/1998 | Bansbach | 192/21.5 |
| 5,931,757 A | 8/1999 | Schmidt | 475/2 |
| 6,208,036 B1 * | 3/2001 | Evans et al. | 290/46 |
| 6,254,507 B1 * | 7/2001 | Downs | 477/4 |
| 6,371,267 B1 | 4/2002 | Kao et al. | 192/21.5 |
| 6,464,608 B2 * | 10/2002 | Bowen et al. | 475/5 |
| 6,478,705 B1 | 11/2002 | Holmes et al. | 475/5 |
| 6,527,658 B2 | 3/2003 | Holmes et al. | 475/5 |
| 6,539,720 B2 * | 4/2003 | Rouse et al. | 60/651 |
| 6,729,423 B2 | 5/2004 | Kobayashi et al. | 180/65.3 |
| 2002/0115532 A1 * | 8/2002 | Wakashiro et al. | 477/111 |

* cited by examiner

*Primary Examiner*—Hoang M Nguyen

(57) ABSTRACT

A powertrain includes an engine, a multi-speed transmission connected to a final drive, and a selectively engageable magnetorheological fluid clutch drivingly connected between the engine and multi-speed transmission. A motor/generator is operatively connected to the engine and the magnetorheological fluid clutch for selectively exchanging power with the engine and/or the magnetorheological fluid clutch such that the motor/generator may be used to start the engine, to drive the multi-speed transmission, and to receive energy from the magnetorheological fluid clutch for regenerative braking.

4 Claims, 1 Drawing Sheet

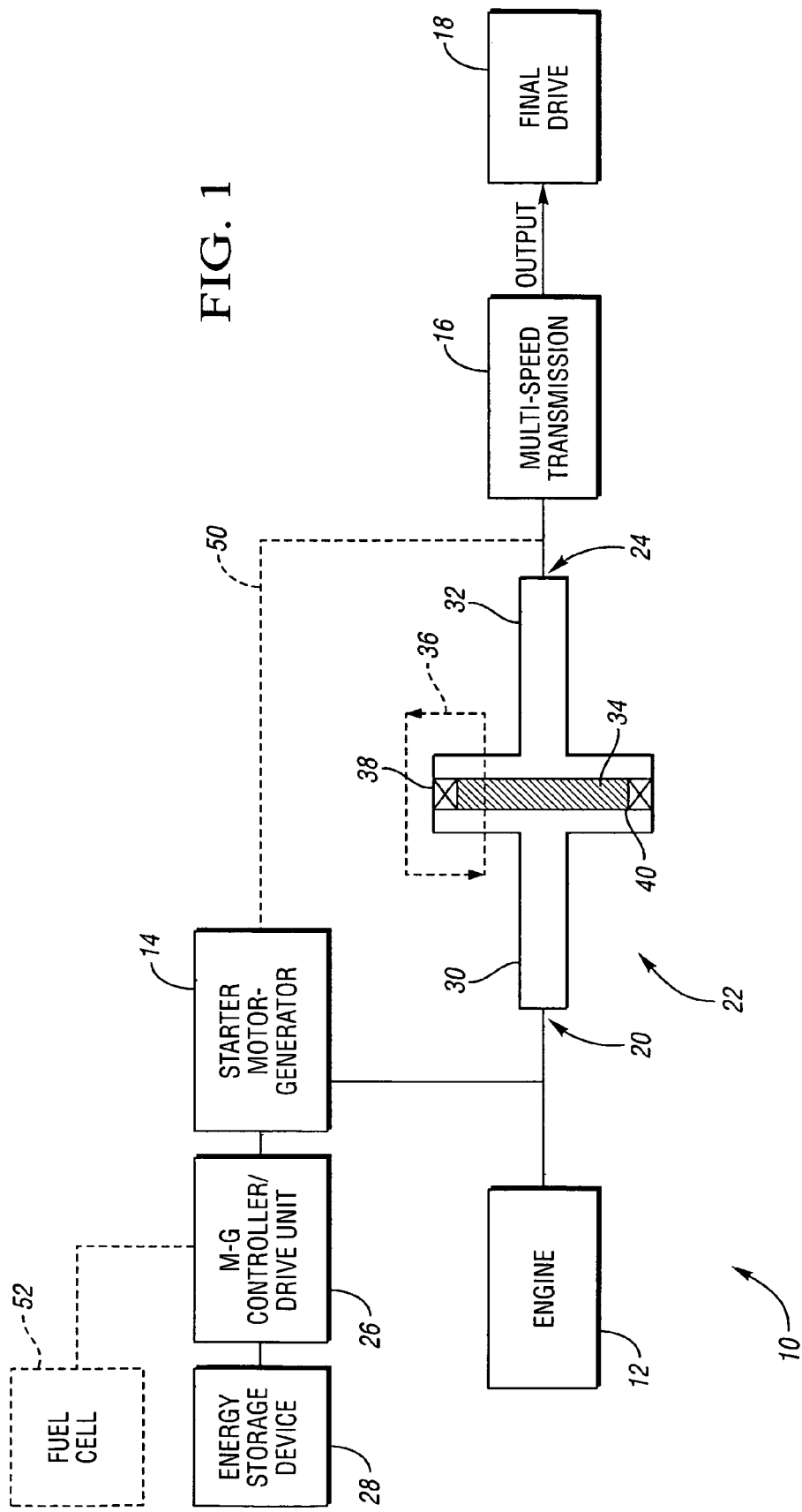

ELECTRIC HYBRID POWERTRAIN SYSTEM HAVING A MAGNETORHEOLOGICAL FLUID CLUTCH

TECHNICAL FIELD

This invention relates to hybrid powertrains having a magnetorheological fluid (MRF) clutch selectively connecting an internal combustion engine and an electric motor/generator with a multi-speed transmission.

BACKGROUND OF THE INVENTION

Hybrid type powertrains generally employ an internal combustion engine and one or more motor/generator units that operate in concert to provide driving power to the wheels of a vehicle. The electric drive capability of the vehicle is generally used where noise or exhaust emissions are of prime concern. This type of vehicle is suited, by way of example, for operation in a closed environment (electric drive), such as a passenger terminal, and an open environment (engine drive) such as a highway. Thus the vehicle is ideal for transporting passengers from a terminal to their destinations.

Vehicles employing a hybrid powertrain are also well suited for urban transportation where a significant amount of stop and go driving is undertaken. These vehicles use electrical regenerative braking to recharge the electrical power storage devices (batteries). During urban travel the powertrain takes advantage of both the internal combustion engine and the electric drive to improve both fuel economy and exhaust emissions. The hybrid powertrain permits the engine to be shut-off at vehicle stops. The electric drive may be used for engine restart and/or vehicle acceleration.

The hybrid powertrains are also suited for over-the-road transportation where the electric drive units can be utilized to assist in driving the vehicle during high-power output conditions such as rapid acceleration and hill climbing. The electric drive units might also provide propulsion in the event that engine operation is inadvertently discontinued. Also the powertrains generally include planetary gearing which is designed to effectively combine the electrical and mechanical drive units into an integrated system.

So-called Flywheel-Alternator-Starter (FAS) systems position the electric drive between the engine and the transmission. These systems may increase the transmission size longitudinally and radially.

U.S. Pat. No. 6,208,036, commonly owned with the present application and hereby incorporated by reference in its entirety, provides a hybrid powertrain with an engine, a power transmission, and an electric drive (motor/generator). A torque converter is positioned between the engine and a planetary gear arrangement, and the rotor of the motor/generator is secured to the outer periphery of the torque converter. The stator of the motor/generator is secured within the housing assembly surrounding both the rotor and the torque converter.

SUMMARY OF THE INVENTION

The invention provides a hybrid powertrain having a magnetorheological fluid clutch (MRF) selectively connecting an internal combustion engine and an electric motor/generator with a multi-speed transmission.

In one embodiment, the powertrain includes an engine; a multi-speed transmission connected to a final drive; and a selectively engageable magnetorheological fluid clutch (MRF) drivingly connected between the engine and the multi-speed transmission. A motor/generator is operatively connected to the engine and the magnetorheological fluid clutch for selectively exchanging power with the engine and/or the magnetorheological fluid clutch, such that the motor/generator may be used to start the engine, to drive the multi-speed transmission via the magnetorheological fluid clutch, and to receive energy from the magnetorheological fluid clutch for regenerative braking.

The powertrain may also include a motor/generator controller/drive unit and energy storage device operatively connected to the motor/generator. The motor/generator may be operatively connected directly to the engine and to the magnetorheological fluid clutch. Alternatively, the motor/generator is directly connected to the magnetorheological fluid clutch and operatively connected to the engine by engagement of the magnetorheological fluid clutch.

The multi-speed transmission may be a continuously variable transmission or a planetary multi-speed transmission.

The motor/generator may be connected to the input side or the output side of the magnetorheological fluid clutch. Also, the invention may be implemented in purely electric vehicles, including battery electric vehicles and fuel cell electric vehicles, or in fuel-cell hybrid vehicles wherein a fuel cell and battery provide propulsion power.

The invention may be most beneficial in using a magnetorheological fluid clutch in coupling an electrified transmission (i.e., a transmission having a motor/generator) to an internal combustion engine for a single-electric-motor hybrid electric vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of a powertrain incorporating a MRF clutch in accordance with the present invention.

DESCRIPTION OF THE PREFERRED EMBODIMENTS

Referring to FIG. 1, a powertrain 10 in accordance with the present invention includes an engine 12, a motor/generator 14, and a multi-speed transmission 16 connected to a final drive 18. The engine 12 and motor/generator 14 are connected to the input side 20 of a magnetorheological fluid (MRF) clutch 22. The multi-speed transmission 16 is connected to the output side 24 of the magnetorheological fluid clutch 22.

The motor/generator 14 is operatively connected to a motor/generator controller/drive unit 26 for controlling operation of the motor/generator 14. The motor/generator controller/drive unit 26 is connected to an energy storage device (battery) 28 for exchanging energy therewith.

The engine 12 is preferably an internal combustion engine. The motor/generator 14 includes a stator and a rotor (not shown). The motor/generator 14 is capable of delivering electrical energy and of converting electrical energy to mechanical energy. The motor/generator controller/drive unit 26 may include a drive circuit and a conventional electronic control unit (ECU), which controls the condition of the motor/generator 14 as well as the transmission 16, the engine 12 and the magnetorheological fluid clutch 22.

The controller/drive unit 26 includes a programmable digital computer that collects data, such as speeds, torque and temperatures, etc. and distributes control signals to provide the desired shift pattern in the transmission, fuel feed, and clutch operation, for example. The controller/drive unit 26 also controls the operation of the motor/generator 14 to generate electrical energy for storage in an electrical storage device 28, such as a battery, or to deliver power to the magnetorheological fluid clutch 22. The motor/generator 14 will provide starting power for the engine 12, or add to the output power of the engine 12. This may eliminate the more conventional starter and alternator from the vehicle accessory apparatus. The motor/generator 14 can also provide power to drive the vehicle through the transmission 16 when the engine 12 is not providing power. The motor/generator 14 may also generate electricity for storage in the battery 28 during regenerative braking and other times as prescribed by the control system.

The multi-speed transmission 16 may be a conventional planetary transmission, a continuously variable transmission or an electrically variable transmission with the motor/generator 14 integrated therein.

The magnetorheological fluid clutch 22 may be embodied as the magnetorheological fluid clutch described in commonly owned U.S. Pat. No. 6,371,267 for a Liquid Cooled Magnetorheological Fluid Clutch for Automotive Transmissions, which is hereby incorporated by reference in its entirety. As shown in FIG. 1 of the present application, the magnetorheological fluid clutch 22 is shown schematically to include an input member 30 which is operatively connectable to an output member 32 via a magnetorheological fluid 34 when a magnetic flux 36 is applied to the magnetorheological fluid 34 to change its torque transfer properties.

Magnetorheological fluids including a suspension of solid particles in a selected liquid are known wherein the fluid's yield stress must be exceeded in order to initiate flow. When the fluid is exposed to a magnetic field, the flow threshold yield stress increases as the flux density in the field increases. Yield stress is also known to increase as the volume fraction of solid particles in the suspension is increased. Accordingly, a desired yield stress for a selected magnetorheological fluid operating in a clutch can be achieved by varying the volume fraction of suspended particles. The magnetorheological fluid carries a selected volume percent of solid particles that permits slippage between the input member 30 and the output member 32, each of which has a magnetic core, when the magnetorheological fluid clutch 22 is partially engaged during acceleration and transmission shifting events. An increased torque transfer is effected between the input and output members 30, 32 as the magnetorheological fluid clutch 22 is further engaged by intensifying the magnetic flux 36, and substantially complete coupling is provided when the magnetorheological fluid clutch 22 is fully engaged with negligible slippage between the input and output members 30, 32.

FIG. 1 also illustrates the coil 38 which induces the magnetic flux 36, and the seal 40 which encloses the magnetorheological fluid 34 between the input and output members 30, 32.

FIG. 1 further illustrates the alternative connection 50 whereby the motor/generator 14 is connected to the output side 24 of the magnetorheological fluid clutch 22 such that engagement of the magnetorheological fluid clutch 22 is required in order to use the motor/generator 14 to start the engine 12. The motor/generator 14 can, accordingly, be connected to the input side 20 or output side 24 of the magnetorheological fluid clutch 22.

FIG. 1 also illustrates that an alternative energy conversion device, such as a fuel cell 52, may be used with the magnetorheological fluid clutch 22 wherein the engine 12 is eliminated to provide a fuel cell electric vehicle. The fuel cell 52 may also be used with the engine 12 for a fuel cell hybrid vehicle.

The invention may be most beneficial in using the magnetorheological fluid clutch 22 to couple an electrified transmission to an internal combustion engine for a single electric motor hybrid electric vehicle.

In all of these applications, the power flow across the magnetorheological fluid clutch 22 may be in either direction. The clutch 22 may be locked up or slipping. When slipping, either side of the clutch may be rotating at the higher speed. The invention may provide improved energy efficiency and reduced noise and vibration in comparison with prior art systems.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   an engine;
   an energy conversion system;
   a selectively engageable magnetorheological fluid clutch operatively connected to said engine;
   a motor/generator operable to start said engine and in driving engagement with an output side of said selectively engageable magnetorheological fluid clutch; and
   a multi-speed transmission in driving engagement with said output side of said magnetorheological fluid clutch;
   wherein said motor/generator is operatively connected to said engine by engagement of said magnetorheological fluid clutch, and wherein engagement of said clutch is required in order to use said motor/generator to start said engine.

2. The powertrain of claim 1, wherein said energy conversion system comprises a fuel cell.

3. The powertrain of claim 2, further comprising a motor/generator controller/drive unit operatively connected between said fuel cell and said motor/generator.

4. The powertrain of claim 1, wherein said multi-speed transmission is a continuously variable transmission.

* * * * *